United States Patent
Al-Damluji et al.

(10) Patent No.: US 11,848,846 B2
(45) Date of Patent: Dec. 19, 2023

(54) JITTER BUFFER SIZE MANAGEMENT

(71) Applicant: Microsoft Technology Licensing, LLC, Redmond, WA (US)

(72) Inventors: Salem Amin Al-Damluji, Hertfordshire (GB); Anish Kavia, Berkshire (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/682,666

(22) Filed: Feb. 28, 2022

(65) Prior Publication Data
US 2023/0275824 A1 Aug. 31, 2023

(51) Int. Cl.
*H04L 43/087* (2022.01)
*H04L 43/106* (2022.01)
*H04L 43/067* (2022.01)
*H04L 43/0817* (2022.01)

(52) U.S. Cl.
CPC .......... *H04L 43/087* (2013.01); *H04L 43/067* (2013.01); *H04L 43/0817* (2013.01); *H04L 43/106* (2013.01)

(58) Field of Classification Search
None
See application file for complete search history.

(56) References Cited

U.S. PATENT DOCUMENTS 10,735,120 B1 *  8/2020  Kantharaju ........... H04L 43/087
2019/0014050 A1 *  1/2019  Wang .................. H04L 49/9005

FOREIGN PATENT DOCUMENTS

CN         110875860 B  *  7/2020
WO     WO-2022019874 A1 *  1/2022

* cited by examiner

*Primary Examiner* — John A Follansbee
*Assistant Examiner* — Kamal M Hossain
(74) *Attorney, Agent, or Firm* — ArentFox Schiff LLP (57) ABSTRACT

Jitter buffer size management is performed by receiving, by a network device, a stream of media content packets. Each packet characterized by a timestamp applied at a source. The device determines, for each of at least one consecutive timestamped packet pair of the stream, a difference between the timestamps of packets in the pair. The device estimates a packetization time (ptime) of the stream as a function of each determined difference. The device adjusts size of the jitter buffer as a function of the estimated ptime.

20 Claims, 5 Drawing Sheets

200

Receive, by a communications processing device, a stream of media content packets, each packet characterized by a time stamp applied at a transmitter.
210

Determine, by the device, for each of at least one consecutive packet pair of the stream, a difference between the time stamps of packets in the consecutive packet pair.
220

Estimate, by the device, a packetization time (ptime) of the stream as a function of each determined difference.
230

Adjust, by the device, a size of the jitter buffer as a function of the estimated ptime.
240

JITTER BUFFER SIZE MANAGEMENT

BACKGROUND

Voice over Internet Protocol (VoIP) describes a set of technologies for the delivery of voice communications and multimedia sessions over IP networks, such as the Internet. VoIP sessions can proceed similar to traditional telephony from the user viewpoint, but instead of being transmitted over a circuit-switched network, a digital form of the information is packetized and transmission occurs as IP packets over a packet-switched network.

In contrast to a circuit-switched network, VoIP over a packet switched network does not inherently guarantee that information is not dropped (packet loss), delivered too late to be of use (excessive latency), or delivered out of order because of variations in package transit time from the source to the destination. Packets sent from the same source do not always reach the destination at regular intervals, even if they were transmitted in a continuous stream. In VoIP "jitter" is a measurement of this variation in packet delay. Jitter can occur for various reasons, e.g., network congestion, network timing drift, or network route changes.

A "jitter buffer" is a managed data store where packets can be received, stored, and then sent on (e.g., to an output processor) in (mostly) evenly spaced intervals in spite of transit time variation. The jitter buffer intentionally delays the arriving packets so that the end user experiences a clearer connection with less distortion. Jitter buffers mitigate jitter by buffering a number of packets to absorb the delay differences between them, and then outputting the packets in order at a (mostly) constant rate. This gives the more delayed packets a chance to catch up so that all packets are output relatively smoothly. As with any type of buffering, the deeper the jitter buffer is, the longer a packet's playout delay becomes.

There are two kinds of jitter buffers, static and dynamic/adaptive. A static jitter buffer typically is pre-configured. A dynamic/adaptive jitter buffer can be configured to adapt to changes in the network's delay—e.g., by changing its size.

SUMMARY

The following presents a simplified summary of one or more aspects of the technology disclosed herein in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In several examples, computer implemented methods, devices, and tangible non-transitory computer-readable media for packet buffering are provided. In some examples, Jitter buffer size management is performed by receiving, by a network device, a stream of media content packets. Each packet characterized by a timestamp applied at a source. The device determines, for each of at least one consecutive timestamped packet pair of the stream, a difference between the timestamps of packets in the pair. The device estimates a packetization time (ptime) of the stream as a function of each determined difference. The device adjusts size of the jitter buffer as a function of the estimated ptime.

In some examples, estimating the ptime includes determining a minimum determined difference among the determined differences. In some examples, estimating the ptime comprises estimating the ptime across a window of the timestamps. In some examples, adjusting the size of the jitter buffer comprises adjusting an output time of at least one packet of the jitter buffer in an integer number of increments of the estimated ptime. In some examples, estimating the ptime comprises estimating the ptime at least as great as a threshold ptime. In some such examples, the threshold ptime equals zero.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

Turning now to FIG. 1-FIG. 5, examples are depicted with reference to one or more components and one or more methods that may perform the actions or operations described herein. Although the operations described below in are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 1:
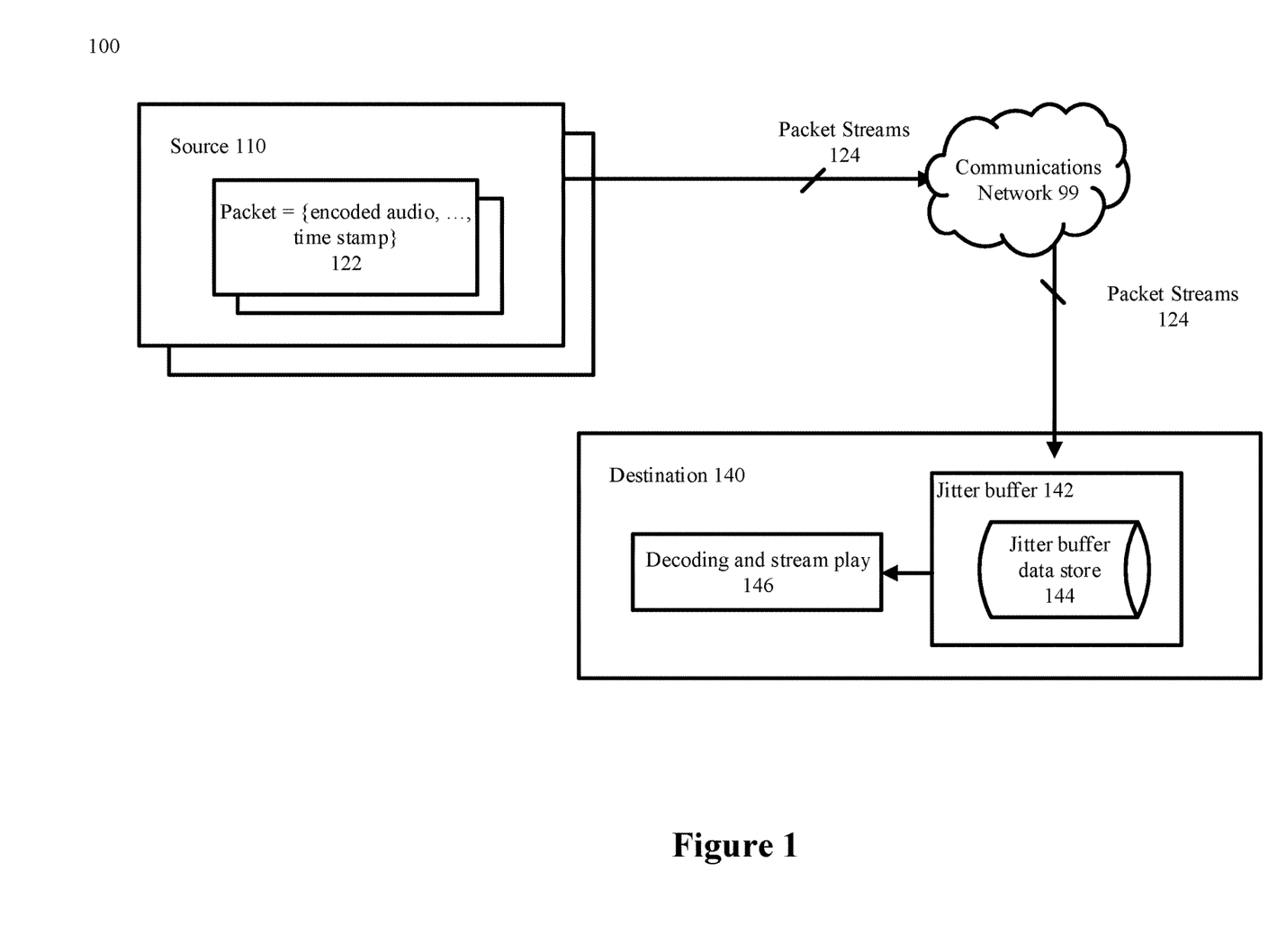
FIG. 1 is an illustration of examples of the technology disclosed herein in the context of a notional architecture.

Referring to FIG. 1, an example of the technology disclosed herein in the context of a notional architecture 100 is illustrated. While the technology disclosed herein is described in examples using streaming audio packets, the concepts extend to other packetized media types. In such architectures, a sequence of packets 122 containing encoded audio are transmitted by a source 110 as a packet stream 124 over a communications network 99 to destination 140 for decoding and stream play as part of a "session." A session is a temporary and interactive information interchange between two or more communicating devices.

Session Initiation Protocol (SIP) is a signaling protocol used for initiating, maintaining, and terminating real-time sessions that include voice, video and messaging applications. SIP is used for signaling and controlling multimedia communication sessions in applications such as VoIP. SIP works in conjunction with several other protocols that specify and carry the session media. Most commonly, media type and parameter negotiation and media setup are performed with the Session Description Protocol (SDP), which is carried as payload in SIP messages. For the transmission of media streams (e.g., voice, video) the SDP payload carried in SIP messages typically employs a version of Real-time Transport Protocol (RTP). SDP messages can use packetization time (ptime), equivalent to the packetization interval described above, to identify the length of media in each packet 122 that is sent in a packet stream 124—note that ptime is a duration, and not a point in time. However, the ptime information element is often absent from packets 122. Each RTP packet 122 does however carry a timestamp. The timestamp is related (in a uniform way across a given stream) to the time of creation/capture of the media content contained in the packet 122. This timestamp generated by the device generating the media and so the separation in RTP timestamps of two consecutive packets will always be the intended separation for the two packets. Note that the present discussion focuses on packets of encoded media, and not on any payload that differs from the original media stream, e.g., signaling packets such as dual-tone multi-frequency (DTMF) packets, or on Comfort noise packets in a PCM stream.

Communications network 99 between source 110 and destination 140 is characterized by variations in transit time (packet delay variation (PDV)) between the source 110 and the destination 140. A jitter buffer 142 includes a data store 144 of packets, with each packet indexed by a transmit time determined by the jitter buffer 142. Jitter buffer 142 transmits/outputs the buffered packets in proper order to a decoding and stream play function 146. As described above, jitter buffers operate using delay to build up a stream of packets with the correct timing separation to account for PDV across the medium from the transmitter. When jitter buffer 142 operates in adaptive mode it has the ability to increase or decrease in size, e.g., based on the PDV of the incoming packet stream 124. A larger PDV calls for a larger jitter buffer data store 144, while a smaller PDV allows the jitter buffer data store 144 to be smaller. Both the greater resources required by a larger jitter buffer 142 and the greater latency introduced in the stream by a larger jitter buffer 142 argue for tailoring the jitter buffer 142 size to the PDV.

One type of adaptive jitter buffer 142 operates on un-decoded packets. Instead of fine-grained control (and consequent increased resource demands on destination 140) of examining decoded audio/video for inter-speech places to condense/expand the decoded media content of the stream, an adaptive jitter buffer 142 operating on un-decoded packets typically does not add or subtract a fraction of a packet from the buffer size (and consequently, from the stream). In adaptive jitter buffers 142 operating on un-decoded packets, changes to the size of such jitter buffers 142 are in an integer number of packet intervals.

It would be useful know the size of such packet intervals when adjusting the size of jitter buffers 142 that operate on un-decoded packets in order to adjust the size of such jitter buffers 142 in intervals of estimated packetization time. Examples of the technology disclosed herein use a packet timestamp from one or more consecutive pairs of packets 122 to estimate the packetization time (ptime) in order to manage jitter buffer 142 size. In some examples, the jitter buffer estimates the ptime of an incoming media stream by calculating the difference between the timestamp of two consecutive packets and convert this into milliseconds. In some examples, the technology does this for every packet that comes in on the given media stream and then uses the smallest difference between two consecutive packets as the ptime for the media.

The technology disclosed herein excludes DTMF packets from this calculation. While DTMF packets are part of the media stream, DTMF packets use RTP timestamps in a way not used in examples of the technology disclosed herein.

Figure 2:
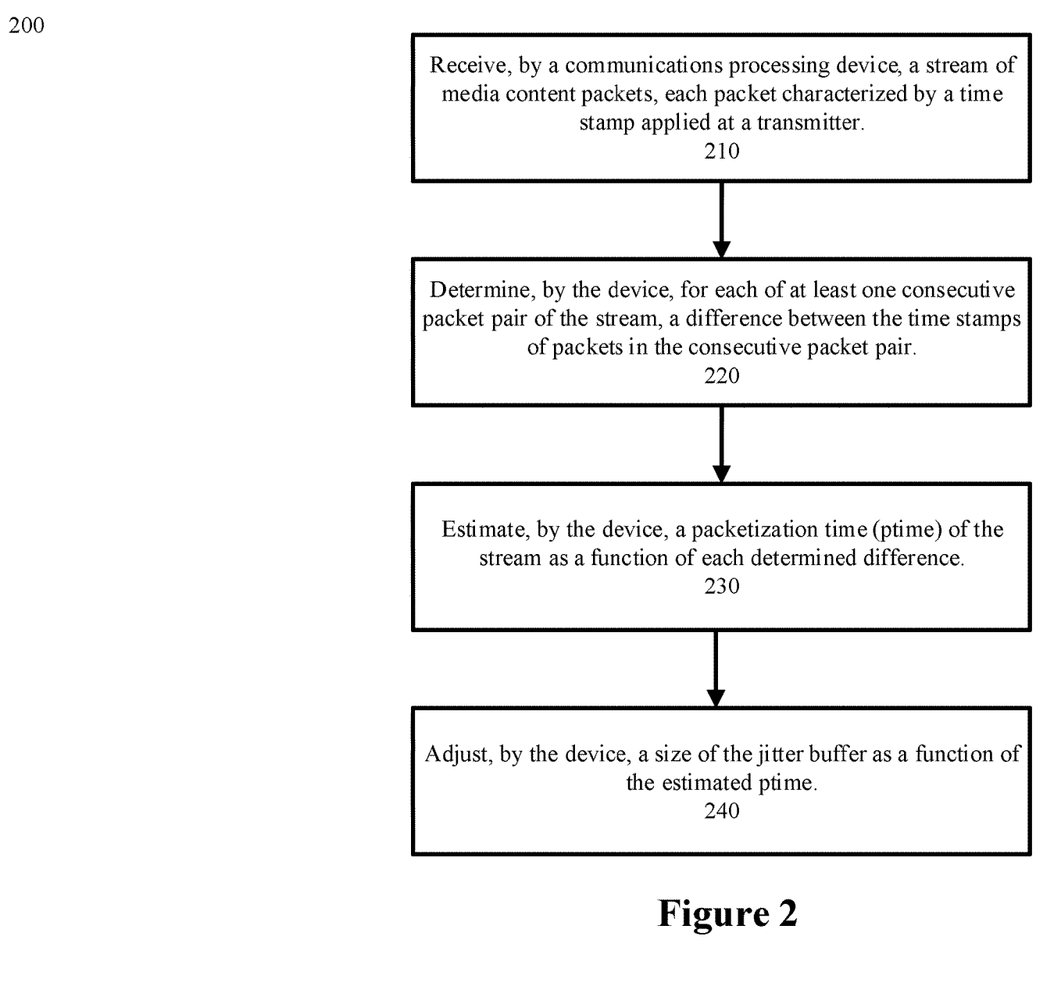
FIG. 2 is a flow chart of example methods of jitter buffer size management, in accordance with examples of the technology disclosed herein.

Referring to FIG. 2, and continuing to refer to FIG. 1 for context, example methods 200 for jitter buffer size management are shown, in accordance with the technology disclosed herein. In such methods, a network device receives a stream of media content packets—Block 210. Each packet is characterized by a timestamp applied at a source. As noted above, the present discussion focuses on packets of encoded media, and not on signaling packets such as dual-tone multi-frequency (DTMF) packets.

Figure 3A:
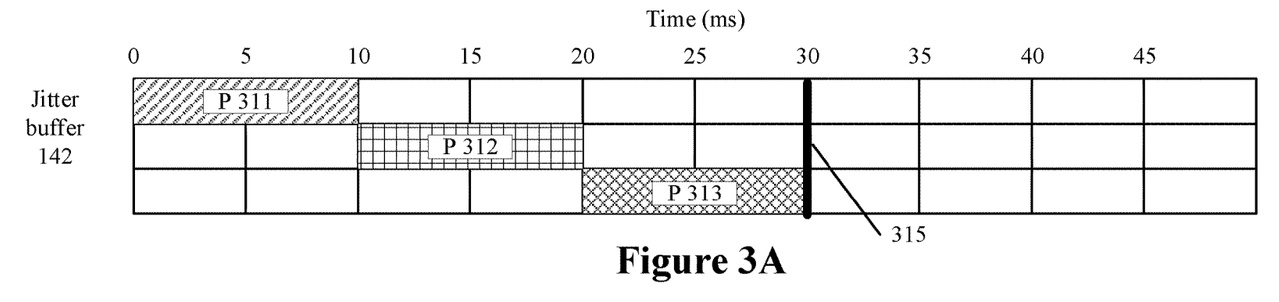
FIG. 3A, FIG. 3B, and FIG. 3C are each part of a continuing example of jitter buffer size management, in accordance with examples of the technology disclosed herein.
Figure 3B:
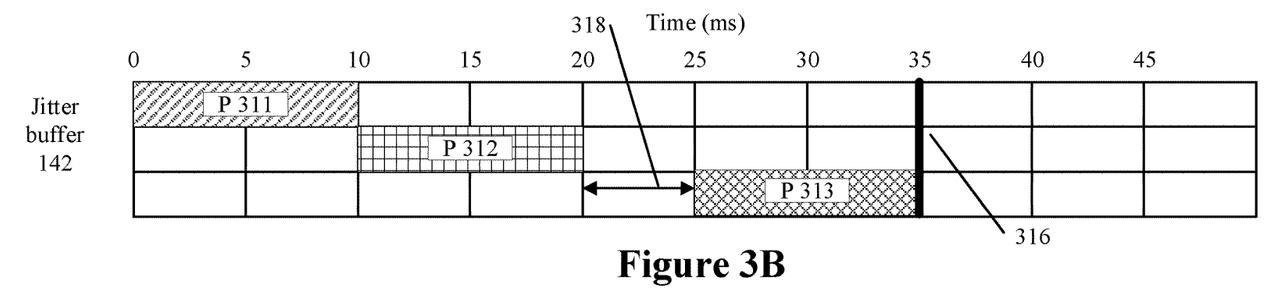
Figure 3C:
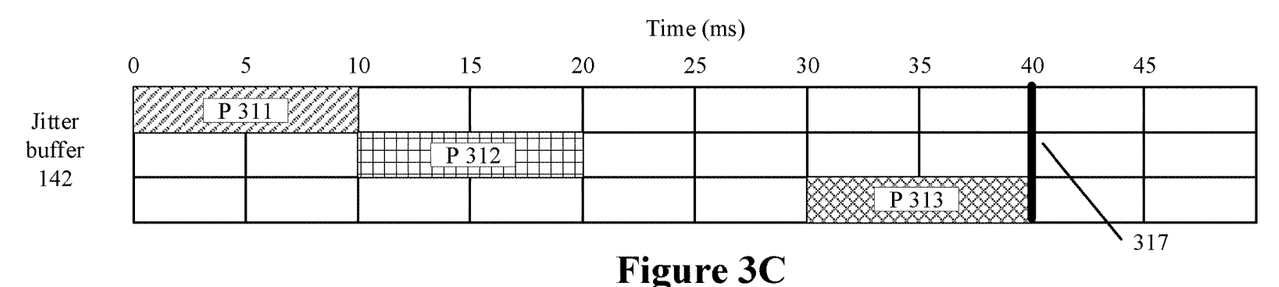

Referring to FIG. 3A, FIG. 3B, and FIG. 3C, and continuing to refer to prior figures for context, a continuing example 300 is shown in which a jitter buffer 142 of 30 ms in size 315 is show with ordered packets P311, P312, and P313. Each packet was received, not necessarily in the order shown, by destination 140. Each packet 122 has a duration of 10 ms of audio. Due to irregularities at the source 110, packet P311 bears a timestamp of 00:00:13 for its encoded audio data (stored in the packet data and not in the media data or media payload), packet P312 bears a timestamp of 00:00:24, and packet P313 bears a timestamp of 00:00:34. Note that these timestamps are in relation to the source 110, and are not the "time (ms)" for sending to the decoding and stream play function 146 shown in the figures, or the time of reception by the destination 140.

Packet P311 is scheduled to be sent to the decoding and stream play function 146 at time t=0 ms (which is a relative time and may be in the near future). Packet P312 is scheduled to be sent to the decoding and stream play function at time t=10 ms from t=0 ms. Packet P313 is scheduled to be sent to the decoding and stream play function 146 at time t=20 ms from the current time. As a packet 122 is sent to the decoding and stream play function 146, the jitter buffer pointer is moved to point at the next packet in the queue.

Referring to FIG. 3B, and continuing to refer to prior figures for context, if after receiving packet P312, the destination 140 (or jitter buffer 142) determined that the incoming PDV was too high and consequently determined to increase the size of the jitter buffer 142 to 35 ms in size 316, the destination 140 (or jitter buffer 142) could move the start of packet P313 to 25 ms. However, this approach may impact the cadence of the media play. If decoding and stream play function 146 was performing silence detection and acting on it, the decoding and stream play function 146 would not be able to insert a full packet 122 between the end of packet P312 and the beginning of packet P313, since the gap 318 is only 5 ms.

Referring again to FIG. 2, after receiving the stream of packets, the network device determines, for each of at least one consecutive timestamped packet pair of the stream, a difference between the timestamps of packets in the pair—Block 220.

In the continuing example, the timestamp differences are determined as: |P311−P312|=|13−24|ms=11 ms, and |P312−P313|=|24−34|ms=10 ms. In variations on this approach, some examples of the technology disclosed herein can determine the difference between all pairs in a stream, either for the entire stream or for a window (moving or tumbling) in the stream.

The network device then estimates a packetization time (ptime) of the stream as a function of each determined difference—Block 230.

In the continuing example, the destination 140 estimates ptime=min(|P311−P312|=11 ms, |P312−P313|=10 ms)=10 ms. While the stream of the continuing example is only three packets long and pairwise differences are determined for all consecutive pairs, for real world streams, the network device can estimate the ptime using differences across a window of timestamps of consecutive pairs—either a moving window or a tumbling window). In some examples, e.g., in order to avoid anomalies, the network device can establish threshold times for minimum and maximum ptimes. In some examples, the minimum ptime can be zero. In some examples, the mode of the distribution of differences can be used. In some examples, other approaches, e.g., lowest common denominator among all pairwise differences (not just consecutive packets) can be used.

The network device then adjusts a size of the jitter buffer as a function of the estimated ptime—Block 240. Referring to FIG. 3C, and continuing to refer to prior figures for context, jitter buffer 142 adjusts the jitter buffer 142 size 317 to 40 ms, since 40 ms is consistent with integer multiples of the estimated ptime. Unlike the adjustment of FIG. 3B, this adjustment would allow downstream processing to perform functions such as silence detection in a manner that is more consistent with fidelity.

One example application for the technology disclosed herein in a Session Border Controller (SBC). An SBC is a network device deployed to protect session initiation protocol (SIP) based voice over VoIP networks. While some SBCs are deployed at borders between two service provider networks, such devices (and related devices) can be deployed between a service provider's access network and a backbone network to provide service to residential and/or enterprise customers. A "session" can be a call between two or more parties. Each call includes one or more signaling message exchanges that control the call, and one or more call media streams that carry the call's audio, video, or other data along with information of call statistics and quality. Together, these packet streams, e.g., a packet stream 124, make up a session. Some SBCs, or SBC-like devices, handle thousands (or even tens of thousands) of calls/packet streams concurrently.

While the continuing example cites VoIP, note that VoIP can contain packets for not only voice, but also other media and protocols. Jitter buffers are equally applicable to other media streams over IP (e.g. video), and to voice over other protocols (e.g. TDM).

Figure 4A:
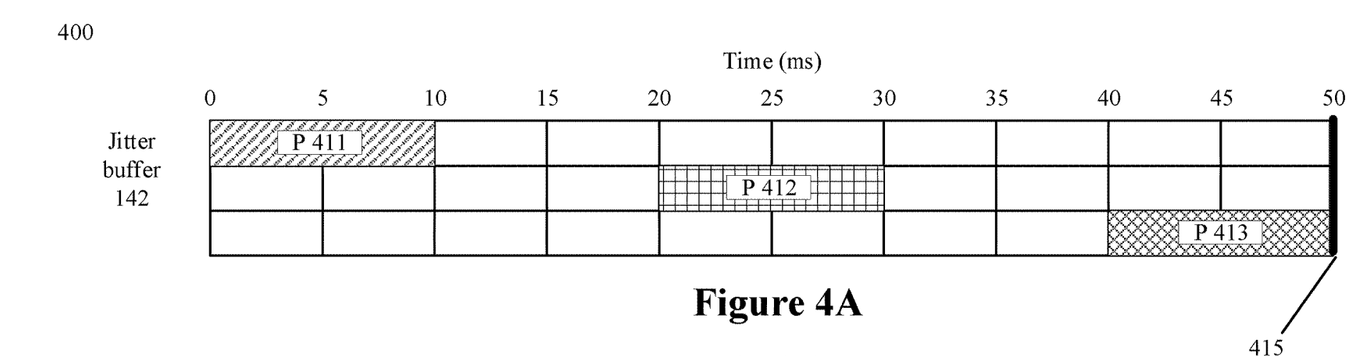
FIG. 4A, FIG. 4B, and FIG. 4C are each part of an additional example of jitter buffer size management, in accordance with examples of the technology disclosed herein.
Figure 4B:
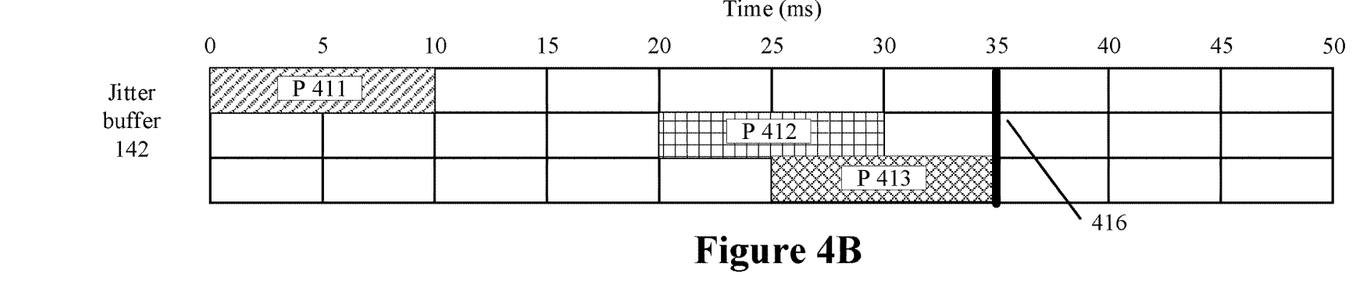
Figure 4C:
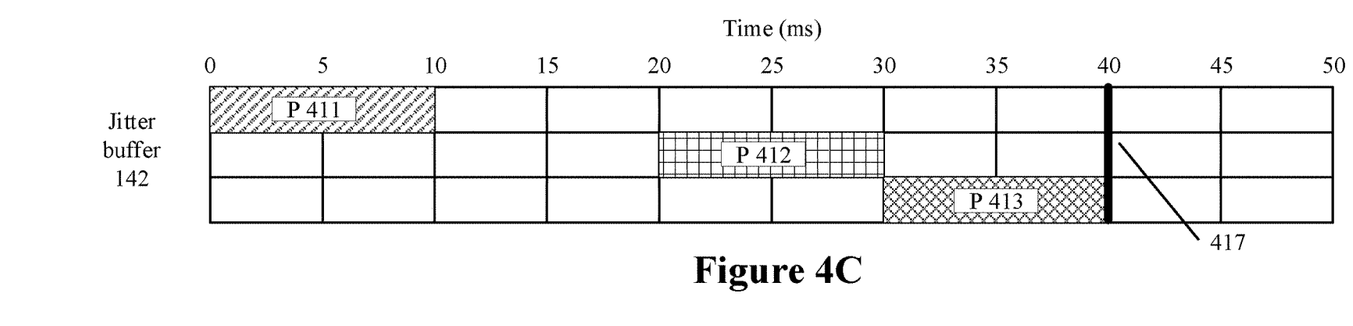

Referring to FIG. 4A, FIG. 4B, and FIG. 4C, and continuing to refer to prior figures for context, an example 400 for decreasing the size of a jitter buffer using estimated ptime is shown, in accordance with the technology disclosed herein. In such an example, which a jitter buffer 142 of 50 ms in size 415 is show with ordered packets P411, P412, and P413. Each packet 122 was received, not necessarily in the order shown, by destination 140. Each packet 122 has a duration of 10 ms of audio. Due to irregularities at the source 110, packet P411 bears a timestamp of 00:00:13, packet P412 bears a timestamp of 00:00:24, and packet P413 bears a timestamp of 00:00:34. Note that these timestamps are in relation to the source 110, and are not the "time (ms)" for sending to the decoding and stream play function 146 shown in the figures, or the time of reception by the destination 140.

Packet P411 is scheduled to be sent to the decoding and stream play function 146 at time t=0 ms (which is a relative time and may be in the near future). Packet P412 is scheduled to be sent to the decoding and stream play function 146 at time t=20 ms from t=0 ms. Packet P413 is scheduled to be sent to the decoding and stream play function 146 at time t=40 ms from the current time. As a packet 122 is sent to the decoding and stream play function 146, the remaining packets 122 are moved forward in time to be sent and subsequent packets are loaded into the right end of jitter buffer 142.

Referring to FIG. 3B, and continuing to refer to prior figures for context, if after receiving packet P312, the destination 140 (or jitter buffer 142) determined that the incoming PDV was low enough and consequently determined to decrease the size of the jitter buffer 142 to 35 ms in size 416. The destination 140 (or jitter buffer 142) could move the start of packet P413 to 25 ms. However, this approach may impact the cadence of the media play as it would cause clipping to the audio of packet 412.

Referring to FIG. 4C, and continuing to refer to prior figures for context, jitter buffer 142 adjusts the jitter buffer 142 size 417 to 40 ms, since 40 ms is consistent with integer multiples of the estimated ptime. Unlike the adjustment of FIG. 4B, this adjustment would allow downstream processing to play P412 unclipped.

Figure 5:
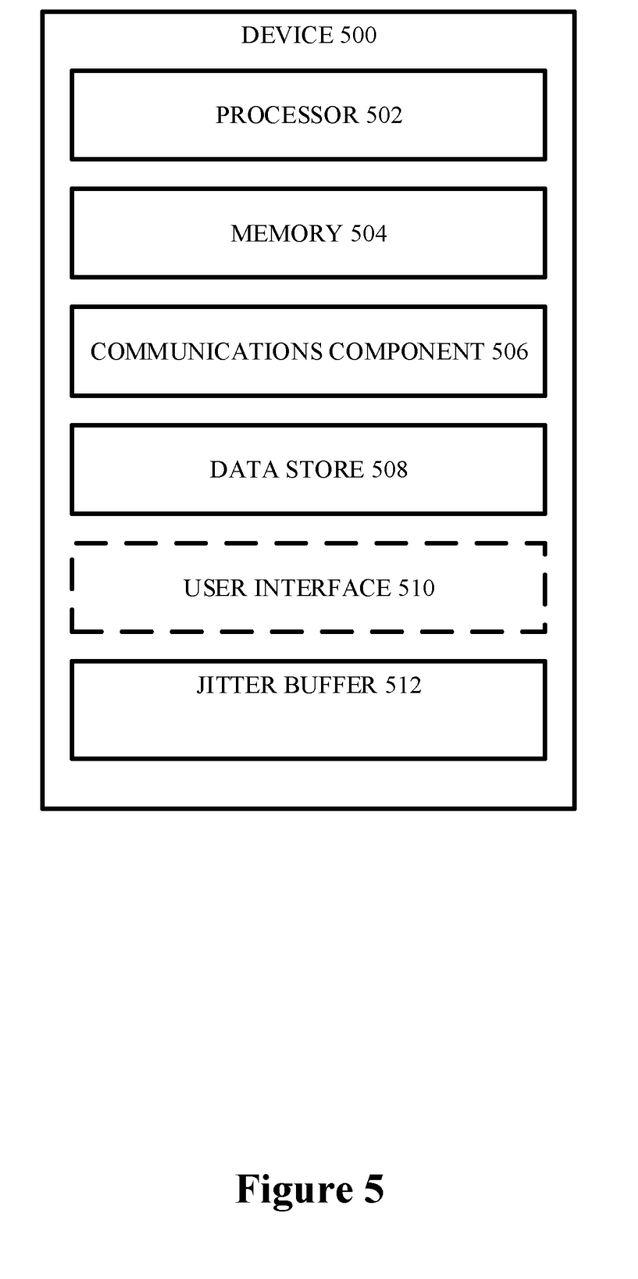
FIG. 5 is a schematic diagram of an example of a device for performing functions described herein.

FIG. 5 illustrates an example of device 500. In one aspect, device 500 may include processor 502, which may be similar to processor 502 for carrying out processing functions associated with one or more of components and functions described herein. Processor 502 can include a single or multiple set of processors or multi-core processors. Moreover, processor 502 can be implemented as an integrated processing system and/or a distributed processing system.

Device 500 may further include memory 504, such as for storing local versions of operating systems (or components thereof) and/or applications being executed by processor 502, such as a streaming application/service, etc., related instructions, parameters, etc. Memory 504 can include a type of memory usable by a computer, such as random access memory (RAM), read only memory (ROM), tapes, magnetic discs, optical discs, volatile memory, non-volatile memory, and any combination thereof.

Further, device 500 may include a communications component 506 that provides for establishing and maintaining communications with one or more other devices, parties, entities, etc. utilizing hardware, software, and services as described herein. Communications component 506 may carry communications between components on device 500, as well as between device 500 and external devices, such as devices located across a communications network and/or devices serially or locally connected to device 500. For example, communications component 506 may include one or more buses, and may further include transmit chain components and receive chain components associated with a wireless or wired transmitter and receiver, respectively, operable for interfacing with external devices.

Additionally, device 500 may include a data store 508, which can be any suitable combination of hardware and/or software, that provides for mass storage of information, databases, and programs employed in connection with aspects described herein. For example, data store 508 may be or may include a data repository for operating systems (or components thereof), applications, related parameters, etc.) not currently being executed by processor 502. In addition, data store 508 may be a data repository for streaming application/service 512 and/or one or more other components of the device 500.

Device 500 may optionally include a user interface component 510 operable to receive inputs from a user of device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof. For example, user interface 510 may render streaming content for consumption by a user (e.g., on a display of the device 500, an audio output of the device 500, and/or the like).

Device 500 may additionally include a jitter buffer component 512, which may be similar to or may include jitter buffer 142. In this regard, device 500 may be operable to perform a role in packet buffering, as described herein. In some examples, jitter buffer component 512 of device 500 provides: means for receiving, by a communications processing device, a stream of media content packets, each packet characterized by a timestamp applied at a transmitter; means for determining, by the device, for each of at least one consecutive packet pair of the stream, a difference between the timestamps of packets in the consecutive packet pair; means for estimating, by the device, a packetization time (ptime) of the stream as a function of each determined difference; and means for adjusting, by the device, a size of the jitter buffer as a function of the estimated ptime.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

As a third further example, the technology disclosed herein includes methods, devices, and non-transitory computer-readable medium storing instructions thereon for . . . .

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

We claim:

1. A method of jitter buffer size management, comprising:
   receiving, by a network device, a stream of media content packets, each packet characterized by a timestamp applied at a source;
   determining, by the network device, for each consecutive timestamped packet pair of the stream, a difference between the timestamps of packets in the pair, wherein the difference in consecutive timestamps of the packets in the pair indicates an irregularity at the source;
   estimating, by the network device, a packetization time (ptime) of the stream as a function of each determined difference, excluding receiving times of the packets; and
   adjusting, by the network device, a size of the jitter buffer at least in part by adjusting an output time of at least one packet of the jitter buffer in an integer number of increments of the estimated ptime.

2. The method of claim 1, wherein estimating the ptime comprises determining a minimum determined difference among the determined differences.

3. The method of claim 1, wherein estimating the ptime comprises estimating the ptime across a window of the timestamps.

4. The method of claim 1, wherein estimating the ptime comprises estimating the ptime at least as great as a threshold ptime.

5. The method of claim 4, wherein the threshold ptime equals zero.

6. A network device for jitter buffering, comprising:
a memory; and
at least one processor coupled to the memory, the memory including instructions executable by the at least one processor to cause the network device to:
receiving, by a network device, a stream of media content packets, each packet characterized by a timestamp applied at a source;
determining, by the network device, for each consecutive timestamped packet pair of the stream, a difference between the timestamps of packets in the pair, wherein the difference in consecutive timestamps of the packets in the pair indicates an irregularity at the source;
estimating, by the network device, a packetization time (ptime) of the stream as a function of each determined difference, excluding receiving times of the packets; and
adjusting, by the network device, a size of the jitter buffer at least in part by adjusting an output time of at least one packet of the jitter buffer in an integer number of increments of the estimated ptime.

7. The network device of claim 6, wherein estimating comprises determining a minimum determined difference among the determined differences.

8. The network device of claim 6, wherein estimating the ptime comprises estimating the ptime across a window of the timestamps.

9. The network device of claim 6, wherein estimating the ptime comprises estimating the ptime at least great as a threshold ptime.

10. The network device of claim 9, wherein the threshold ptime equals zero.

11. A non-transitory computer-readable medium storing instructions thereon that, when executed by a network device, causes the network device to perform operations comprising:
receiving, by a network device, a stream of media content packets, each packet characterized by a timestamp applied at a source;
determining, by the network device, for each consecutive timestamped packet pair of the stream, a difference between the timestamps of packets in the pair, wherein the difference in consecutive timestamps of the packets in the pair indicates an irregularity at the source;
estimating, by the network device, a packetization time (ptime) of the stream as a function of each determined difference, excluding receiving times of the packets; and
adjusting, by the network device, a size of a jitter buffer at least in part by adjusting an output time of at least one packet of the jitter buffer in an integer number of increments of the estimated ptime.

12. The medium of claim 11, wherein estimating comprises determining a minimum determined difference among the determined differences.

13. The medium of claim 11, wherein estimating the ptime comprises estimating the ptime across a window of the timestamps.

14. The medium of claim 11, wherein estimating the ptime comprises estimating the ptime at least as great as a threshold ptime.

15. The medium of claim 14, wherein the threshold ptime equals zero.

16. A network device for jitter buffering, comprising:
means for receiving, by the network device, a stream of media content packets, each packet characterized by a timestamp applied at a transmitter;
means for determining, by the network device, for each consecutive packet pair of the stream, a difference between the timestamps of packets in the consecutive packet pair, wherein the difference in consecutive timestamps of the packets in the pair indicates an irregularity at the source;
means for estimating, by the network device, a packetization time (ptime) of the stream as a function of each determined difference, excluding receiving times of the packets; and
means for adjusting, by the network device, a size of a jitter buffer at least in part by adjusting an output time of at least one packet of the jitter buffer in an integer number of increments of the estimated ptime.

17. The network device of claim 16, wherein means for estimating comprises means for determining a minimum determined difference among the determined differences.

18. The network device of claim 16, wherein means for estimating the ptime comprises means for estimating the ptime across a window of the timestamps.

19. The network device of claim 16, wherein means for estimating the ptime comprises means for estimating the ptime at least as great as a threshold ptime.

20. The network device of claim 19, wherein the threshold ptime equals zero.

* * * * *